W. W. & S. I. WILKINS.
AUTO ATTACHMENT.
APPLICATION FILED OCT. 7, 1918.
1,302,112.
Patented Apr. 29, 1919.
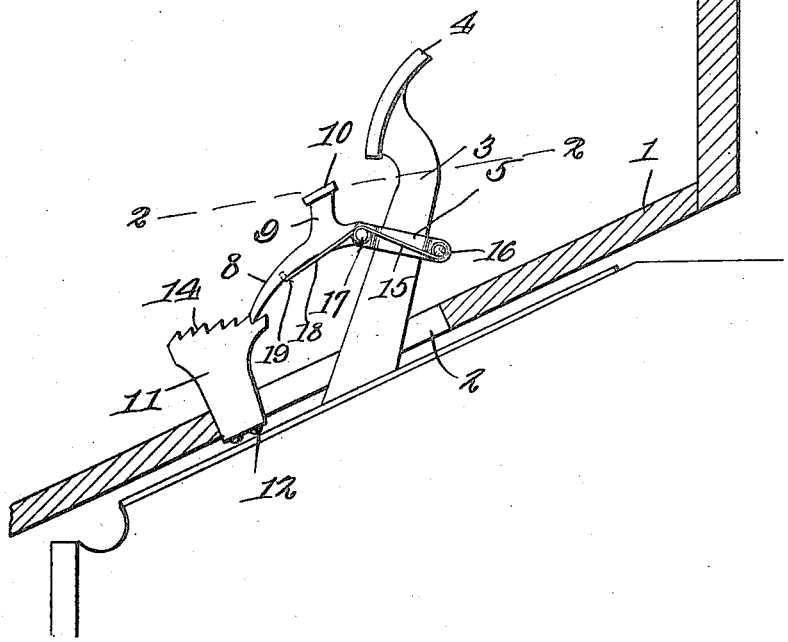
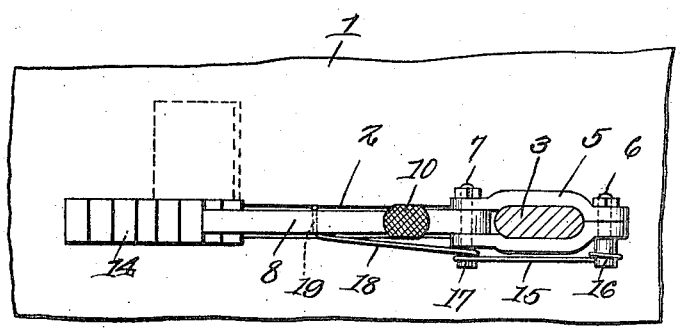
S. I. Wilkins
W. W. Wilkins, Inventors

UNITED STATES PATENT OFFICE.

WENDELL W. WILKINS AND SHELL I. WILKINS, OF CANISTEO, NEW YORK.

AUTO ATTACHMENT.

1,302,112.      Specification of Letters Patent.      Patented Apr. 29, 1919.

Application filed October 7, 1918. Serial No. 257,224.

*To all whom it may concern:*

Be it known that we, WENDELL W. WILKINS and SHELL I. WILKINS, citizens of the United States, residing at Canisteo, in the county of Steuben, State of New York, have invented a new and useful Auto Attachment, of which the following is a specification.

It is the object of this invention to provide novel means whereby the gear-shift pedal of an automobile may be held against movement, and particularly to provide a means whereby the pedal may be controlled to keep the vehicle in low gear. It is within the province of the invention to improve generally and to enhance the utility of devices of that kind to which the present invention appertains.

Changes such as a mechanic might make may be resorted to, within the scope of what is claimed, without departing from the spirit of the invention. In the drawings:—

Figure 1 shows the invention in side elevation, a portion of the vehicle appearing in section; and Fig. 2 is a section on the line 2—2 of Fig. 1, parts, appearing in elevation.

The numeral 1 denotes the foot-board of an automobile, having an opening 2 in which a gear-shift pedal 3 is mounted to swing forwardly and backwardly in the usual way, the pedal being provided at its upper end with a foot-plate 4 which slopes downwardly and rearwardly. A two-part clamp 5 incloses the pedal 3 and is held thereon by means of securing devices 6 and 7. A dog 8 is mounted to swing vertically on the securing device 7, the pivoted end of the dog 8 being disposed between the members of the two-part clamp 5. Intermediate its ends, the dog 8 is supplied with an upstanding boss 9 terminating in a foot-plate 10 disposed at an angle to the foot-plate 4 on the pedal 3 and arranged approximately parallel to the foot-board 1. A keeeper 11 is supported in any desired way, the keeper preferably being located in the opening 2 of the foot-board 1 and being attached as shown at 12 to the foot-board or to any other accessible part of the vehicle. The upper edge of the keeper 11 is supplied with teeth 14 wherewith the rear end of the dog is adapted to engage. The numeral 15 marks a spring, the forward end of which is engaged around the securing device 6 as shown at 16, the intermediate portion of the spring being engaged at 17 around the securing device 7, the spring including a forwardly extended arm 18 terminating in a transverse finger 19 extended beneath the arm 18. The spring normally tends to hold the dog out of engagement with the teeth of the keeper 11, but when a portion of the foot of the operator is on the plate 4, another part of the foot of the operator may engage the plate 10 of the dog 8, thereby depressing the rear end of the dog so that the rear end of the dog will engage with the teeth 14, thereby to hold the pedal 3 against movement, as and for the purposes hereinbefore set forth.

Having thus described the invention, what is claimed is:—

In a device of the class described, a gear-shift pedal; a clamp comprising parts located on opposite sides of the pedal; front and rear securing devices connecting the ends of the parts of the clamp; a dog pivoted on the rear securing device between the rear ends of the parts of the clamp; a fixed keeper wherewith the dog is adapted to engage when depressed; and a spring having its intermediate portion engaged with the rear securing device, one end of the spring being engaged with the front securing device, and the other end of the spring being engaged with the dog to elevate the dog.

In testimony that we claim the foregoing as our own, we have hereto affixed our signatures in the presence of two witnesses.

WENDELL W. WILKINS.
SHELL I. WILKINS.

Witnesses:
E. A. INGALLS,
JOHN TALBOT.

Copies of this patent may be obtained for five cents each, by addressing the "Commissioner of Patents, Washington, D. C."